US006863952B1

United States Patent
Wagner

(10) Patent No.: US 6,863,952 B1
(45) Date of Patent: Mar. 8, 2005

(54) MULTILAYERED, SURFACE-STRUCTURED SEMI-FINISHED PRODUCT CONSISTING OF THERMOPLASTICS AND FILM-STRUCTURING METHOD

(76) Inventor: Werner Wagner, Dels Estranys 69, Urb. Bon Air, ES-07409 Mallorca-Alcudia (ES)

( * ) Notice: Subject to any disclaimer, the term of this patent is extended or adjusted under 35 U.S.C. 154(b) by 29 days.

(21) Appl. No.: 10/129,466

(22) PCT Filed: Nov. 3, 2000

(86) PCT No.: PCT/EP00/10841

§ 371 (c)(1),
(2), (4) Date: Nov. 15, 2002

(87) PCT Pub. No.: WO01/32417

PCT Pub. Date: May 10, 2001

(30) Foreign Application Priority Data

Nov. 3, 1999 (DE) .......................... 199 53 039

(51) Int. Cl.⁷ .......................... B29C 59/02; B32B 3/30; B32B 27/20; B32B 31/22; B32B 33/00
(52) U.S. Cl. ...................... 428/141; 428/212; 428/219; 428/315.5; 428/316.6; 428/411.1; 428/910; 425/112; 425/115; 425/130; 264/284; 264/288.8; 264/289.3; 264/290.2
(58) Field of Search .......................... 428/141, 212, 428/219, 315.5, 316.6, 411.1, 910; 425/112, 115, 130; 264/284, 288.8, 289.3, 290.2

(56) References Cited

U.S. PATENT DOCUMENTS

| 3,399,425 A | 9/1968 | Lemelson ................ 425/327 |
| 3,814,791 A | 6/1974 | Jones .................... 264/164 |
| 3,895,153 A | 7/1975 | Johnston et al. .......... 428/141 |
| 3,983,278 A | 9/1976 | Wardle ................... 428/92 |
| 4,183,889 A | 1/1980 | Brendel .................. 264/134 |
| 4,189,336 A | 2/1980 | Huttlesz ................. 156/72 |
| 4,257,755 A | 3/1981 | Lemelson ................ 425/168 |
| 4,308,649 A | 1/1982 | Gilpatrick et al. ........ 26/2 R |
| 4,451,419 A | 5/1984 | Bye et al. ............... 264/164 |
| 4,463,045 A | 7/1984 | Ahr et al. ............... 428/131 |
| 4,629,643 A | 12/1986 | Curro et al. ............. 428/131 |
| 4,877,679 A * | 10/1989 | Leatherman et al. ....... 442/58 |
| 5,099,553 A | 3/1992 | Dischler ................. 26/2 R |
| 5,192,484 A | 3/1993 | Matuzawa et al. ......... 264/555 |
| 5,505,747 A | 4/1996 | Chesley et al. ........... 51/297 |
| 5,518,865 A | 5/1996 | Hoessel et al. ........... 430/326 |
| 5,695,868 A * | 12/1997 | McCormack ............... 442/389 |
| 5,733,628 A | 3/1998 | Pelkie ................... 428/138 |
| 5,792,411 A | 8/1998 | Morris et al. ............ 264/400 |
| 5,814,413 A | 9/1998 | Beerwart ................. 428/516 |
| 6,277,479 B1 * | 8/2001 | Campbell et al. .......... 428/213 |
| 6,312,786 B1 | 11/2001 | Schwinn ................. 428/143 |
| 6,511,734 B1 | 1/2003 | Wagner .................. 428/152 |

FOREIGN PATENT DOCUMENTS

| CA | 2324313 | 10/1999 |
| DE | 1964736 | 7/1970 |
| DE | 19524076 | 10/1996 |
| DE | 19605788 | 5/1997 |
| DE | 19731315 | 1/1999 |
| DE | 19812097 | 9/1999 |
| DE | 19843109 | 3/2000 |
| EP | 0089746 | 9/1983 |
| EP | 0275653 | 7/1988 |
| EP | 309073 | 3/1989 |
| EP | 0899086 | 3/1999 |
| GB | 919100 | 2/1963 |
| GB | 1158471 | 7/1969 |
| JP | 01014364 | 1/1989 |
| JP | 03 253341 | 11/1991 |
| WO | WO 96/13979 | 5/1996 |
| WO | WO 97/02128 | 2/1997 |
| WO | WO 99/06623 | 2/1999 |
| WO | WO 99/16608 | 4/1999 |
| WO | WO 99/32272 | 7/1999 |
| WO | WO 99/54106 | 10/1999 |
| WO | WO 99/47339 | 11/1999 |
| WO | WO 00/16965 | 3/2000 |
| WO | WO 00/34562 | 6/2000 |

* cited by examiner

Primary Examiner—Ramsey Zacharia
(74) Attorney, Agent, or Firm—O'Keefe, Egan & Peterman, LLP

(57) ABSTRACT

The invention relates to a multi-layered semi-finished product with at least one first and one second film layer. The semi-finished product has a velour-type structure on the outer surface of the first film layer facing away from the second film layer and the second layer has a filler material. The first and second film layers are permeable. A first proportion of a filler material in the first film layer is smaller than a second proportion of a filler in the second film layer.

17 Claims, No Drawings

MULTILAYERED, SURFACE-STRUCTURED SEMI-FINISHED PRODUCT CONSISTING OF THERMOPLASTICS AND FILM-STRUCTURING METHOD

The invention relates to a multi-layer semi-finished product with at least one first- and one second film layer, wherein the semi-finished product exhibits a velour-like structure at an outer surface facing away from the second film layer and the second film layer has a filler material.

EP 309 073 A2 discloses a method for manufacturing vapour-permeable films which consist of drawn polyolefin film with a laminated non-woven HDPE fabric; the polyolefin film is filled with a high fraction of inorganic filler so that a water vapour permeability of at least 1000 g/m$^2$ per day is obtained. In addition to the actual manufacture of the polyolefin film, the film manufactured by the known method also requires the additional process of laminating the non-woven fabric using an adhesive. Especially if the non-woven fabric layer is very thin, problems are encountered in the application of the adhesive. Recycling compatibility is difficult to achieve and the required binding time for the adhesive delays the procedure.

A method for manufacturing a surface-structured, film-like semi-finished product from a thermoplastic material is inherently known from DE 1981 2097 C1. According to this patent specification, a thermoplastic plastic material in the molten state or in the form of a film is applied to a surface with fine cavities constructed as a negative structure (matrix) in relation to the desired structure. The matrix surface is exposed to an under-pressure from outside or from inside so that the cavities belonging to the matrix are evacuated. The matrix including the cavities is at least partly filled with the thermoplastic plastic material and the deformed thermoplastic plastic material, still lying on the surface, is made to solidify by cooling, wherein it takes on the corresponding surface structure on the side brought in contact with the surface. After solidifying, the plastic material is removed from the surface wherein the thermoplastic material which has penetrated into the cavities and been withdrawn from these forms a pile consisting of projections.

The projections forming the pile are drawn by combing, brushing, scraping and/or shear mangling wherein the length of the projections is increased by at least twice the original length and a fibre-like structured semi-finished product is formed at least on one side where the projections are stretched to form hair fibres.

Tests have shown that it is not sufficient to change the formulation of said film in the aforesaid patent specification such that a filler of an inherently known type of organic or inorganic origin is mixed with said film to make the film into a porous or vapour-permeable film after drawing. If the film material is filled very high, that is, as much filler is added as would be required to produce the vapour permeability, the film surface or the melt can then no longer be made sufficiently fluid to produce the fine hair fibres.

With a two-layer film there is basically the problem that a highly filled mass indeed produces a film in the drawn state having sufficient vapour permeability but the second layer for which a melt suitable for hair formation is used according to the prior art, again cannot be drawn to produce vapour permeability.

The object is thus to provide a multi-layer semi-finished product of the type specified initially which is permeable to vapour and/or liquid.

This object is achieved with a multi-layer semi-finished product with at least one first and one second film layer, wherein the semi-finished product exhibits a velour-like structure at an outer surface of the first film layer facing away from the second film layer and the second film layer has a filler material, by the fact that the first and the second film layers are permeable, wherein a first fraction of a filler material in the first film layer is smaller than a second fraction of a filler material in the second film layer.

A suitable velour film is accordingly obtained if a polymer material is prepared and melted in at least two extruders, each polymer preparation is supplied to a nozzle and the melt emerging from the nozzle is brought in direct contact with a matrix roller. For example, a matrix roller having 1500 to 10,000 holes per square centimeter with a depth of 250 to 450 $\mu$m and a hole diameter of 40 to 80 $\mu$m has proved to be suitable here.

Preferably suitable as the matrix surface is a steel roller having fine holes of said dimensions. Steel rollers having a plastic surface can also be used. Fine holes of said type can be produced using a laser.

The melt applied to the matrix surface can be incorporated more easily into the cavities if the cavities, as is inherently known, are made almost empty of air by preliminary evacuation or by applying a vacuum to the bottom of the cavities so that the melt is sucked into the cavities. After cooling the melt solidifies and a film can be removed from the matrix. First produced is a two-layer film having a plurality of fine naps on its inner surface. The naps can be drawn by suitable and inherently known treatment, especially combing, brushing, scraping and/or shear mangling.

In another method a film can be manufactured using a film which has already been pre-produced. In this case, a forming tool is used for the film, which consists of at least two rollers, namely a heated steel roller and as the second roller, a steel roller provided with a plastic cladding in which the matrix with the cavities has been produced by a laser beam.

In this case also, the matrix has between 200 and 10,000 extremely small holes per square centimeter with a hole diameter of 50 to 80 $\mu$m and a hole depth of approximately 600 $\mu$m. The film to be processed is heated in the roller slot or just before it so that said film begins to flow at its surface. The polymer layer at the front of the film is pressed into the cavities under the pressure in the roller slot and is pressed out as a result of the overpressure when removing the film.

After cooling a fine nap structure appears on the film. This can be enlarged by at least twice the original length by combing, brushing, scraping and/or shear mangling so that the projections are lengthened to form hair fibres.

The object is thus to provide an improved method where the aforesaid disadvantages do not occur and with which it is possible to manufacture a multi-layer, surface-structured, porous, film-like, semi-finished product from thermoplastic plastics without changing the procedural units. The fields of application of these semi-finished products should lie in the fields of domestic products, hygiene products and other fields of application where porous or vapour-permeable films or semi-finished products are required.

The object is achieved by a film structuring method of the type specified initially, having the features of claim 9.

In the new method two formulations are used for the melts. The substrate film not equipped with velour contains a larger fraction of fillers than the front of the film equipped with velour.

Calcium carbonate or barium sulphate mixed with the substrate film in a fraction between 40 and 50 wt. % are used as fillers, for example, whereas the film layer at the front side only contains 20 to 30 wt. % of the same filler. The finely ground inorganic fillers having a grain size of preferably 3 to 5 μm can be mixed with water-repelling substances or surfactants such as calcium stearate which facilitate working into the plastic mass.

Suitable as fillers are organic and/or inorganic substances having low affinity to the surrounding thermoplastic plastic and a significantly lower elasticity than said plastic. Fillers can be selected from the group comprising calcium carbonate, talc, clay, kaolin, quartz, diatomaceous earth, magnesium carbonate, barium carbonate, magnesium sulphate, barium sulphate, calcium sulphate, zinc oxide, magnesium oxide, titanium dioxide, glass powder or zeolite.

Preferably used as polymers for manufacturing the films are polyolefins such as polyethylene or polypropylene, mixtures of said polymers, copolymers and mixtures of homopolymers and copolymers. However, it is also possible to use plastics based on other thermoplastics such as polyesters, copolyesters, polyamides, polyether esters, polyether amines, polyvinyl alcohols, polyvinyl alkanols, and mixtures or copolymers of said polymer groups.

In addition to a first and a second film, several films lying one above the other can also be used. Each film can consist of a different material, for example, metal film or others. Each film can have a special function: stabilisation, insulation, thermal and/or electrical conduction, coloration, identification etc.

By means of a subsequent drawing process with a suitable mixture, the two-layer film is given both a velour surface and water vapour permeability. The film is stretched in the direction of the machine or in both directions if pre-manufactured blown film is used. In the case of cast films or films cooled directly on the matrix, stretching is preferably in the transverse direction to the machine running direction. In order to achieve stretching in the machine running direction, after lengthening the hairs the velour film is passed over two rollers which run at different speeds. The second roller is driven somewhat faster and thus pulls the film in the machine running direction so that it is stretched.

In order to achieve stretching transverse to the machine running direction, stretching in a stretching frame is used. Another type of stretching uses rollers which partially stretch the films in a left and right ascending fashion with intermeshing elements. Here one roller is held fixed in its bearing and driven. The counter-roller preferably penetrates at least 2 mm into the fixed roller, depending on the required degree of stretching. The depth of penetration of the roller is variable. The teeth of the upper roller are driven until they stall in order to prevent damage to the teeth of the lower roller. It is not necessary to drive the upper roller since power is transmitted through the film to be stretched.

Another roller configuration consists of a pair of rollers having leftward and rightward milled slots which intermesh in a cogwheel fashion. The milled slots are rounded on their outer side and have very finely worked webs approximately 0.7 mm thick. Both rollers have a diameter of 200 to 250 mm. The penetration depth is a maximum of 3 to 6 mm, with a working depth of approximately 2 to 2.5 mm being preferred.

A second pair of rollers provides for CD stretching. Here an offset of around 90° is used compared with said apparatus. The roller diameter is also 200 to 250 mm. The web thickness is 0.78 mm. The maximum penetration depth is 6 mm. For the film material there is a clearance of approximately 0.4 to 0.5 mm on both sides of the film track. Depending on the stretching, the penetration depth during the forming is around 2 to 2.5 mm. Stretching takes place in all cases at normal room temperature, that is approximately between 25 and 30° C. The performance in metres per minute is comparatively very high.

The film becomes broader and thinner as a result of the stretching, i.e., an approximately 80 μm thick polyethylene film having a square meter weight of 80 gram will weigh about 55 to 60 gram per square meter after stretching. A transversely stretched film having an initial thickness of around 60 μm weighs around 42 g per square meter after stretching. The water vapour permeability is 1500 to 3000 g/m$^2$ day depending on the degree of stretching, measured in accordance with ASTM E 96 E, at a measurement temperature of 37° C.

The teeth of the rollers can also be operated offset at a particular angle or perpendicular to intake or running. The pattern of the film can be varied accordingly within the play of the rollers and the stretching thus produced.

It should be emphasised that the textile feel of the velour film is barely changed by the stretching process since the code density of the naps present on the film surface keep the appearance and the feel of the film almost unchanged even after stretching.

As a result of stretching both in the machine direction and transverse thereto, a geometric picture of a fabric-like warp and weft structure is obtained visually for the film. If diagonal drawing is used, the finished film has an interesting satin-like appearance.

AN EXAMPLE IS USED TO EXPLAIN THE METHOD

A double-nozzle extrusion plant is used to produce a two-layer polyethylene film having a front layer made of relatively light flowing polyethylene and a back layer made of a more viscous, less flowing polyethylene. Both layers are filled with calcium carbonate having an average grain size of 1.0 μm which was surface-treated with calcium stearate. The polyethylene mass of the front layer contains preferably 20 to 30 wt. % of a filler material, especially calcium carbonate whereas the back layer preferably contains at least 50 wt. % of a filler material, especially calcium carbonate as filer.

Both film layers have the same thickness; the total thickness is 60 μm to 80 μm.

For the front layer a mixture of 70 parts of a polyethylene having a melting index of 30, measured in accordance with ASTM D 1238, and having a density of 0.885 g/cm$^3$ measured in accordance with ASTM D 792, was mixed with 30 parts of a polyethylene resin, especially an ethylene-octene copolymer, having a melting index of 30 deg/min and a density of 0.902 g/cm$^2$ in accordance with ASTM D 792, 22 wt. % of surface-treated calcium stearate as well as known stabilisers and pigments, and pre-granulated. This polymer mixture was then melted in an extruder and supplied to the double nozzle.

A second extruder was loaded with a HDD polyethylene containing 45 wt. % calcium carbonate and having a melting index of 2.1 deg/min and a density of 0.920 g/m$^2$ before the calcium carbonate was added.

The two-layer film is then produced by the chill roll method. The cooled film is converted into a velour film using forming tools. A polyethylene film with a distinct velour character is thus produced. This film is stretched by 30 to 50% in the machine direction and by 25 to 60% in the transverse direction thereto so it acquires a fine microporosity. After stretching at a temperature of 25 to 30° C. the velour film has a water vapour permeability of 2500 g/m$^2$ day measured in accordance with ASTM E 96 E.

What is claimed is:

1. A multi-layer semi-finished product with at least one first thermoplastic and one second thermoplastic film layer, wherein the semi-finished product exhibits a velour structure at an outer surface of the first film layer facing away from the second film layer and the second film layer has a filler material, characterized in, that the first thermoplastic and the second thermoplastic film layers are permeable, wherein a first fraction of a filler material in the first thermoplastic film layer is smaller than a second fraction of a filler material in the second thermoplastic film layers, and wherein the first and second thermoplastic film layers contain filler material.

2. The semi-finished product according to claim 1, characterized in that the first thermoplastic and the second thermoplastic film layers are at least partly permeable to vapour and impermeable to liquid.

3. The semi-finished product according to claim 1, characterized in that the first thermoplastic film layer has a first fraction of filler material of up to 30 percent by weight.

4. The semi-finished product according to claim 1, characterized in that the first thermoplastic and the second thermoplastic film layers have the same filler material.

5. The semi-finished product according to claim 1, characterized in that a first material of the first thermoplastic film layer is slightly less flowing that a second material of the second thermoplastic film layer.

6. The semi-finished product according to claim 1, characterized in that the semi-finished product has a water vapour permeability between 1500 and 3000 $g/m^2 \cdot day$.

7. The semi-finished product according to claim 1, characterized in that the filler material is inorganic with a surfactant.

8. The semi-finished product according to claim 1, characterized in that the semi-finished product weighs approximately 60 $g/m^2$ and less.

9. The semi-finished product according to claim 1, characterized in that the filler material is calcium carbonate that is surface-treated with calcium stearate.

10. A film structuring method comprising:

providing of at least one first thermoplastic and one second thermoplastic film layer, wherein the first thermoplastic film layer has a smaller fraction of filler material than the second thermoplastic film layer, and wherein the first and second thermoplastic film layers contain filler material, producing of a surface-structured film-like semi-finished product from a surface of the first thermoplastic film layer forming an outer surface of the semi-finished product, wherein a velour structure is worked using a forming tool.

11. The film structuring method according to claim 10, characterized in that the first thermoplastic and the second thermoplastic film layers are stretched separately one from the other.

12. The film structuring method according to claim 10, characterized in that the semi-finished product is stretched between 30% and 50% in the machine direction and between 25% and 60% in the transverse direction.

13. The film structuring method according to claim 10, characterized in that the semi-finished product is stretched diagonally.

14. The film structuring method according to claim 10, characterized in that the velour structure is lengthened.

15. The film structuring method according to claim 10, characterized in that the semi-finished product is stretched so that a vapour-permeable and water-impermeable semi-finished product is produced.

16. A film-producing apparatus to produce a semi-finished product with a velour surface structure according to claim 10, wherein the apparatus has:

a feed apparatus for at least one first and one second thermoplastic film layer filled with filler material to supply these layers lying one above the other to an adjacent processing station, a forming tool to which the film layers lying one above the other can be applied, a stretching device to stretch the semi-finished product to produce a permeable semi-finished product, wherein the stretching device is arranged so that a semi-finished product with a velour outer surface is supplied to it.

17. The film structuring method according to claim 10, characterized in that the first and second film layers are stretched before or after working the structure to obtain a permeable semi-finished product.

* * * * *